(12) United States Patent
Chen et al.

(10) Patent No.: US 12,313,732 B2
(45) Date of Patent: May 27, 2025

(54) CONTEXTUAL VISUAL-BASED SAR TARGET DETECTION METHOD AND APPARATUS, AND STORAGE MEDIUM

(71) Applicant: Anhui University, Hefei (CN)

(72) Inventors: Jie Chen, Hefei (CN); Runfan Xia, Hefei (CN); Zhixiang Huang, Hefei (CN); Huiyao Wan, Hefei (CN); Xiaoping Liu, Hefei (CN); Zihan Cheng, Hefei (CN); Bocai Wu, Hefei (CN); Baidong Yao, Hefei (CN); Zheng Zhou, Hefei (CN); Jianming Lv, Hefei (CN); Yun Feng, Hefei (CN); Wentian Du, Hefei (CN); Jingqian Yu, Hefei (CN)

(73) Assignee: Anhui University, Hefei (CN)

( * ) Notice: Subject to any disclaimer, the term of this patent is extended or adjusted under 35 U.S.C. 154(b) by 522 days.

(21) Appl. No.: 17/662,402

(22) Filed: May 6, 2022

(65) Prior Publication Data

US 2023/0184927 A1    Jun. 15, 2023

(30) Foreign Application Priority Data

Dec. 15, 2021   (CN) .......................... 202111534166.8

(51) Int. Cl.
*G01S 13/90* (2006.01)
*G06T 3/4046* (2024.01)
(Continued)

(52) U.S. Cl.
CPC ........ *G01S 13/9027* (2019.05); *G06T 3/4046* (2013.01); *G06T 7/60* (2013.01);
(Continued)

(58) Field of Classification Search
CPC .. G01S 13/90; G01S 13/9021; G01S 13/9027; G01S 13/9029; G06T 7/73;
(Continued)

(56) References Cited

U.S. PATENT DOCUMENTS 6,333,986 B1 * 12/2001 Petty ....................... G01S 7/411
                                                               342/25 D
9,978,013 B2 *  5/2018 Kaufhold ............... G06N 3/045
(Continued)

*Primary Examiner* — Peter M Bythrow
(74) *Attorney, Agent, or Firm* — DLA PIPER LLP (US)

(57) ABSTRACT

A contextual visual-based synthetic-aperture radar (SAR) target detection method and apparatus, and a storage medium, belonging to the field of target detection is described. The method includes: obtaining an SAR image; and inputting the SAR image into a target detection model, and positioning and recognizing a target in the SAR image by using the target detection model, to obtain a detection result. In the present disclosure, a two-way multi-scale connection operation is enhanced through top-down and bottom-up attention, to guide learning of dynamic attention matrices and enhance feature interaction under different resolutions. The model can extract the multi-scale target feature information with higher accuracy, for bounding box regression and classification, to suppress interfering background information, thereby enhancing the visual expressiveness. After the attention enhancement module is added, the detection performance can be greatly improved with almost no increase in the parameter amount and calculation amount of the whole neck.

5 Claims, 7 Drawing Sheets

(51) Int. Cl.
  *G06T 7/60* (2017.01)
  *G06T 7/73* (2017.01)
  *G06V 10/22* (2022.01)
  *G06V 10/25* (2022.01)
  *G06V 10/40* (2022.01)
  *G06V 10/764* (2022.01)
  *G06V 10/766* (2022.01)
  *G06V 10/77* (2022.01)
  *G06V 10/80* (2022.01)
  *G06V 10/82* (2022.01)

(52) U.S. Cl.
  CPC .............. *G06T 7/73* (2017.01); *G06V 10/225* (2022.01); *G06V 10/25* (2022.01); *G06V 10/40* (2022.01); *G06V 10/764* (2022.01); *G06V 10/766* (2022.01); *G06V 10/7715* (2022.01); *G06V 10/806* (2022.01); *G06V 10/82* (2022.01); *G06T 2207/10044* (2013.01); *G06T 2207/20081* (2013.01); *G06T 2207/20084* (2013.01); *G06V 2201/07* (2022.01)

(58) Field of Classification Search
  CPC ............. G06T 3/4046; G06T 7/60; G06T 2207/10044; G06T 2207/20081; G06T 2207/20084; G06V 10/25; G06V 10/806; G06V 10/7715; G06V 10/40; G06V 10/82; G06V 10/764; G06V 10/225; G06V 10/766; G06V 2201/07
  See application file for complete search history.

(56) References Cited

U.S. PATENT DOCUMENTS

| | | | |
|---|---|---|---|
| 10,976,429 B1* | 4/2021 | Jiang | G06N 3/063 |
| 11,150,327 B1* | 10/2021 | Jiang | G06N 3/049 |
| 11,300,652 B1* | 4/2022 | Wieczorek | G01S 13/9021 |
| 11,402,494 B2* | 8/2022 | Zhai | G06N 3/045 |
| 11,656,353 B2* | 5/2023 | Li | G01S 13/9027 |
| | | | 342/25 F |
| 11,681,036 B2* | 6/2023 | Sharma | G01S 13/9027 |
| | | | 382/159 |
| 2016/0019458 A1* | 1/2016 | Kaufhold | G01S 13/9029 |
| | | | 706/20 |
| 2018/0018805 A1* | 1/2018 | Kutliroff | G06V 20/20 |
| 2020/0258296 A1* | 8/2020 | Pennings | G06T 15/205 |
| 2021/0003697 A1* | 1/2021 | Zhai | G06N 3/08 |
| 2021/0003699 A1* | 1/2021 | Zhai | G01S 13/9027 |
| 2021/0003700 A1* | 1/2021 | Zhai | G06N 3/045 |
| 2021/0012166 A1* | 1/2021 | Braley | G06F 18/251 |
| 2021/0027113 A1* | 1/2021 | Goldstein | G06F 18/24 |
| 2021/0027417 A1* | 1/2021 | Bongio Karrman | G06N 20/00 |
| 2021/0215818 A1* | 7/2021 | Kim | G06V 10/764 |
| 2021/0231795 A1* | 7/2021 | Kolouri | G01S 7/417 |
| 2021/0319243 A1* | 10/2021 | Jin | G06T 7/11 |
| 2022/0057213 A1* | 2/2022 | Singhal | G06T 7/74 |
| 2022/0058428 A1* | 2/2022 | Matsunaga | G01S 17/89 |
| 2022/0122273 A1* | 4/2022 | Kim | G06F 18/253 |
| 2022/0138911 A1* | 5/2022 | Newey | G06T 5/70 |
| | | | 382/100 |
| 2022/0414373 A1* | 12/2022 | Krishnamurthy | G06F 18/214 |
| 2023/0105700 A1* | 4/2023 | Payton | G01S 7/417 |
| | | | 342/25 R |

* cited by examiner

CONTEXTUAL VISUAL-BASED SAR TARGET DETECTION METHOD AND APPARATUS, AND STORAGE MEDIUM

CROSS REFERENCE TO RELATED APPLICATION

This application claims priority to Chinese Patent Application No. 202111534166.8, filed Dec. 15, 2021, which is herein incorporated by reference in its entirety.

TECHNICAL FIELD

The present disclosure relates to the field of target detection, and in particular, to a contextual visual-based synthetic-aperture radar (SAR) target detection method and apparatus, and a storage medium.

BACKGROUND ART

Synthetic-aperture radar (SAR) is an active microwave sensor that produces all-weather earth observations without being restricted by light and weather conditions. Compared to optical remote sensing images, SAR has significant application value. In recent years, SAR target detection and recognition have been widely used in military and civilian fields, such as military reconnaissance, situational awareness, agriculture/forestry management, and urban planning. In particular, future war zones will extend from the traditional areas of land, sea and air to space. As a reconnaissance method with unique advantages, SAR satellites may be used to seize the right to control information on future war zones and even play a decisive role in the outcome of the wars. SAR image target detection and recognition is the key technology for realizing the military/civilian applications. Its core idea is to efficiently filter out regions and targets of interest through detection algorithms, and accurately identify category attributes thereof.

The imaging mechanism of SAR images is greatly different from that of optical images. SAR targets have characteristics such as strong scattering, unclear edge contour information, multiple scales, strong sparseness, being weak and small, sidelobe interference, and complex background, which greatly challenge the SAR target detection and recognition tasks. In recent years, many research teams have also conducted extensive research on the above-mentioned difficulties. However, it is discovered through detailed research that the existing SAR target detection task still has the following problems deserving further discussion.

(1) In the conventional SAR target detection method, the use of a detector with a constant false-alarm rate (CFAR) is a classic approach in radar target detection. CFAR detection, as an important part of automatic radar target detection, can be used as the first step in extracting targets from SAR images, and is the basis for further target recognition. However, the conventional method heavily relies on expert experience to design manual features, which have great feature limitations. The conventional method is difficult to adapt to SAR target detection in complex scenes and cannot be used for large-scale practical applications.

(2) In recent years, with the development of computer vision, convolutional neural networks (CNNs) have been applied to SAR image detection, and a large number of deep neural networks have been developed, including AlexNet, VGGNet, ResNet, and GoogLeNet, which allows Faster R-CNN, SSD, YOLO and so on to be widely used in SAR image recognition. Moreover, the present disclosure mainly relies on the advantages of CNN: it is highly skilled in extracting local feature information from images with more refined local attention capabilities. However, because of the large downsampling coefficient used in the CNN for feature extraction, the network will miss small targets.

(3) In addition, many studies have shown that the actual receptive field in the CNN is much smaller than the theoretical receptive field, which is not conducive to making full use of contextual information, and results in incapability of extracting global representations. The present disclosure can enhance the global capturability of the CNN by continuously stacking deeper convolutional layers. However, this results in two consequences as follows: first, with excessively deep layers, the model needs to learn too many parameters, making it difficult to converge effectively, while the accuracy is not necessarily greatly improved; secondly, the model is too large, which causes the amount of calculation to increase sharply and makes it difficult to guarantee timeliness.

To address the key problems in the SAR image target detection, the present disclosure provides a brand-new contextual visual-based SAR target detection method.

SUMMARY

To overcome the deficiencies in the prior art, the present disclosure provides a contextual visual-based SAR target detection method and apparatus, and a storage medium.

To achieve the objective above, the present disclosure provides the following technical solutions.

A contextual visual-based SAR target detection method is provided, including the following steps:
  obtaining an SAR image; and
  inputting the SAR image into a target detection model, and positioning and recognizing a target in the SAR image by using the target detection model, to obtain a detection result, where
  the target detection model is constructed through the following steps:
  constructing a model framework CRTransSar with a two-stage target detector Cascade-mask-rcnn as basic architecture;
  adding, to the model framework CRTransSar, a feature extraction network CRbackbone based on contextual joint representation learning transformer;
  introducing a self-attention module block to a Swin transformer on which the feature extraction network CRbackbone is based;
  introducing a multidimensional hybrid convolution to PatchEmBed of the Swin transformer; and
  introducing a cross-resolution attention enhancement neck CAENeck to the model framework CRTransSar, to form the target detection model.

Preferably, the positioning and recognizing for the image by using the target detection model specifically includes:
  extracting features from the inputted SAR image by using the feature extraction network CRbackbone to obtain feature maps, and performing multi-scale fusion on the obtained feature maps, to obtain a multi-scale feature map, where a bottom feature map is responsible for predicting a first target, a high-level feature map is responsible for predicting a second target, and the first target is smaller than the second target;
  receiving, by a region proposal network (RPN) module, the multi-scale feature map, and generating anchor boxes, where 9 anchors are generated corresponding to each point on the feature map, which cover all possible objects on the original image; and making a prediction score and a prediction offset for each anchor box by using a 1×1 convolution, then matching all the anchor boxes and labels, and calculating values of intersection over union (IOU) to determine whether the anchor boxes belong to background or foreground, where a standard is established to distinguish positive samples from negative samples, to obtain a set of proposal boxes Proposal, and the IOU indicates an intersection over union between a "predicted bounding box" and a real bounding box;

sending the multi-scale feature map and the proposal boxes Proposal into region of interest (ROI) pooling for unified processing; and sending a processing result into a fully connected RCNN network for classification and regression, to position and recognize the target, so as to obtain a final detection result.

Preferably, when the multidimensional hybrid convolution processes an image, each feature map has dimensions of 2×3×H×W when sent into the PatchEmbed, and has dimensions of 2×96×H/4×W/4 when finally sent into a next module, which is equivalent to 4× downsampling implemented through a convolutional layer and the number of channels becomes 96. In the present disclosure, a layer of multidimensional hybrid convolution module is stacked before 3×3 convolution. The size of a convolution kernel is 4, and the number of channels fed into the convolution is kept unchanged.

Preferably, the self-attention module processes the image through the following steps:

after the feature extraction network CRbackbone proceeds to the PatchEmbed, determining a width and a height of each feature map to determine whether to perform a padding operation; and performing two convolutions on each feature map to change feature channels, feature dimensions, a size of the self-attention module, and the size of the convolution kernel.

Preferably, the cross-resolution attention enhancement neck CAENeck processes the image through the following steps:

receiving the feature maps by the cross-resolution attention enhancement neck CAENeck;

performing upsampling and attention enhancement operations on the feature maps from top to bottom, and connecting the feature maps of different sizes; and performing bottom-up multi-scale feature fusion on the feature maps.

Based on the same inventive concept, the present disclosure further provides a transformer-based SAR target detection apparatus, including a data acquisition module and a data processing module, where the data acquisition module is configured to acquire an SAR image; and the data processing module includes:

a feature extraction and fusion module, configured to extract features from the acquired SAR image to obtain feature maps, and perform multi-scale fusion on the obtained feature maps, to obtain a multi-scale feature map;

an anchor box generating module, configured to receive the multi-scale feature map and generate anchor boxes, where 9 anchors are generated corresponding to each point on the feature map, which cover all possible objects on the original image;

an offset prediction module, configured to make a prediction score and a prediction offset for each anchor box, then match all the anchor boxes and labels, and calculate values of IOU to determine whether the anchor boxes belong to background or foreground, where a standard is established to distinguish positive samples from negative samples, to obtain a set of proposal boxes Proposal; and an image positioning and recognition module, configured to perform classification and regression on the proposal boxes Proposal, to position and recognize the target, so as to obtain a final detection result.

Another objective of the present disclosure is to provide a target detection device, including a memory, a processor, and a computer program stored in the memory and operable on the processor, where the processor performs steps of the method described above when running the computer program.

The present disclosure further provides a computer-readable storage medium, where the computer-readable storage medium stores a computer program, and the computer program, when executed by a processor, performs steps of the method described above.

The contextual visual-based SAR target detection method provided in the present disclosure has the following beneficial effects:

First, to address the lack of global long-range modeling and perception capabilities and restricted performance of the existing CNN-based SAR target detection method, embodiments of the present disclosure innovatively introduce the latest Swin transformer architecture and the local feature extraction module of CNN based on the Swin transformer architecture and redesign a target detection framework, so as to extract global and local feature information jointly. With the Cascade Mask-RCNN architecture as the basic target detection architecture, the present disclosure replaces the original backbone with the Swin transformer, to improve the global feature capability.

Secondly, to address the strong scattering, sparseness, and multiple scales of SAR targets as well as low detection accuracy of dense small targets, embodiments of the present disclosure combine the advantages of the Swin transformer and CNN to design a backbone based on contextual joint representation learning, which is called CRbackbone, so that the model can make full use of contextual information to perform joint representation learning, and extract richer contextual feature salient information, thereby improving the feature description of multi-scale SAR targets. First, the multidimensional hybrid convolution is introduced in the PatchEmbed part to expand the receptive field, depth, and resolution, thereby enhancing the feature perception domain. Furthermore, the self-attention module is introduced to strengthen the contextual information exchange between different windows on the feature map.

In addition, to better adapt to disturbances caused by multi-scale SAR image targets and complex background, embodiments of the present disclosure construct a new cross-resolution attention enhancement neck: CAENeck. The present disclosure designs two-way attention enhancement multi-scale pyramid structure. The two-way multi-scale connection operation is enhanced through top-down and bottom-up attention, to guide learning of dynamic attention matrices and enhance feature interaction under different resolutions. In this way, the model can extract the multi-scale target feature information with higher accuracy, for bounding box regression and classification, to suppress interfering background information, thereby enhancing the visual expressiveness. After the attention enhancement module is added, the detection performance can be greatly improved with almost no increase in the parameter amount and calculation amount of the whole neck.

BRIEF DESCRIPTION OF THE DRAWINGS

In order to illustrate the embodiments and design solutions of the present disclosure more clearly, accompanying drawings of the embodiments will be briefly introduced below. The accompanying drawings in the following description show merely some embodiments of the present disclosure, and other drawings may be derived from these accompanying drawings by a person of ordinary skill in the art without creative efforts.

DETAILED DESCRIPTION OF THE EMBODIMENTS

To enable those skilled in the art to better understand and implement the technical solutions of the present disclosure, the present disclosure is described below in detail with reference to the accompanying drawings and specific embodiments. The following embodiments are only used for describing the technical solutions of the present disclosure more clearly and are not intended to limit the protection scope of the present disclosure.

Embodiment 1

Figure 1:
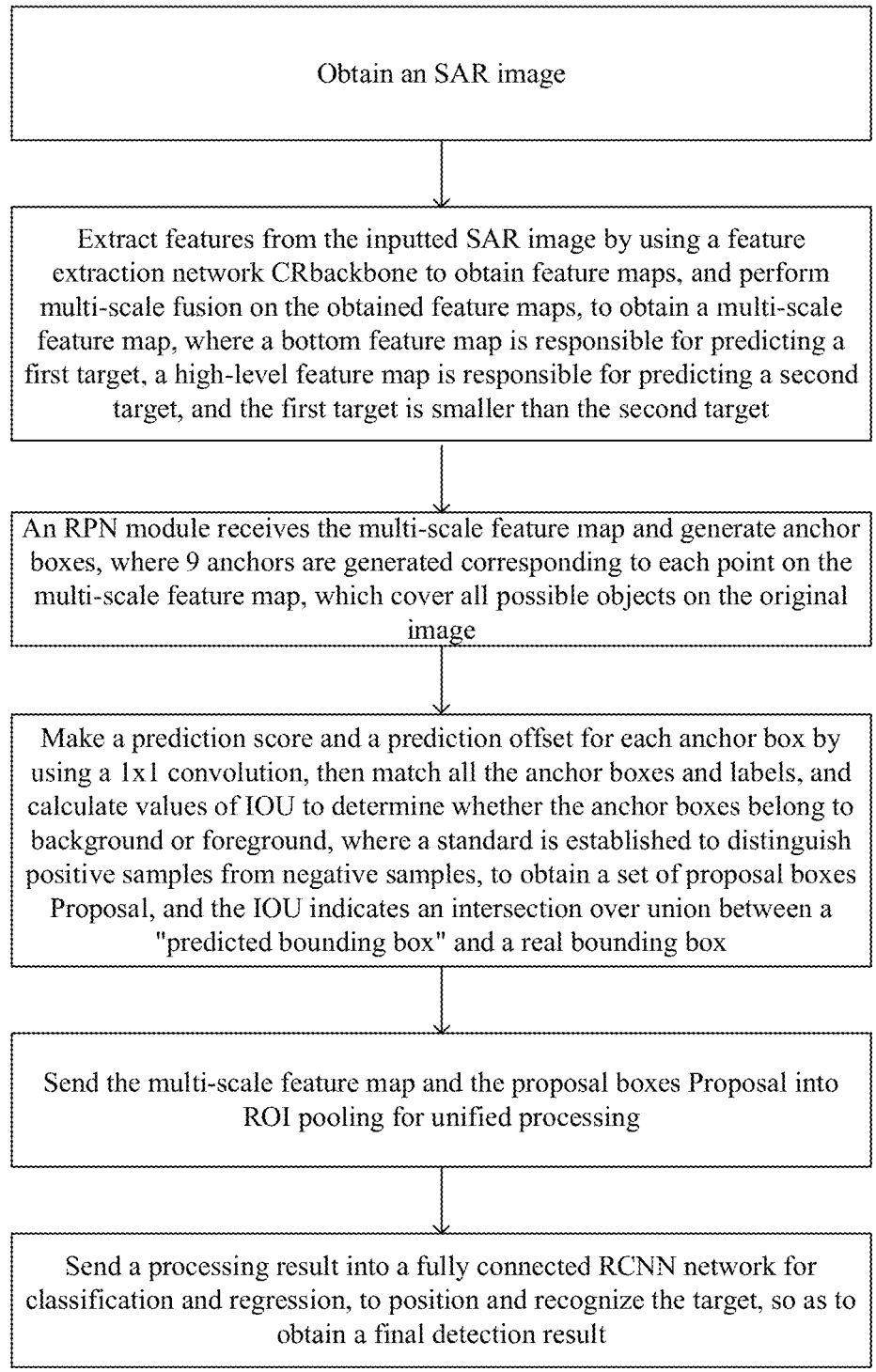
FIG. 1 is a flowchart of a contextual visual-based SAR target detection method according to Embodiment 1 of the present disclosure.

The present disclosure provides a contextual visual-based SAR target detection method. Specifically, as shown in FIG. 1, the method includes the following steps:

Step 1: Obtain an SAR image.

Step 2: Input the SAR image into a target detection model, and position and recognize a target in the SAR image by using the target detection model, to obtain a detection result. A specific detection process is as follows:

Step 2.1: Extract features from the inputted image by using a feature extraction network CRbackbone to obtain feature maps, and perform multi-scale fusion on the obtained feature maps, to obtain a multi-scale feature map, where a bottom feature map is responsible for predicting a small target, and a high-level feature map is responsible for predicting a large target.

Step 2.2: An RPN module receives the multi-scale feature map to start to generate anchor boxes, where 9 anchors are generated corresponding to each point on the feature map, which cover all possible objects on the original image.

Step 2.3: Make a prediction score and a prediction offset for each anchor box by using a 1×1 convolution, then match all the anchor boxes and labels, and calculate values of IOU to determine whether the anchor boxes belong to background or foreground, where a standard is established to distinguish positive samples from negative samples, to obtain a set of proposal boxes Proposal, and the IOU indicates an intersection over union between a "predicted bounding box" and a real bounding box.

Step 2.4: Obtain a set of suitable proposal boxes Proposal after the foregoing steps, send the received feature maps and the suitable proposal boxes Proposal into ROI pooling for unified processing, and then finally send the received feature maps and the suitable proposal boxes Proposal to a fully connected RCNN network for classification and regression, to position and recognize the image, so as to obtain a final detection result.

Based on the same inventive concept, the present disclosure further provides a transformer-based SAR target detection apparatus, including a data acquisition module and a data processing module. The data acquisition module is configured to acquire an SAR image. The data processing module includes a feature extraction and fusion module, an anchor box generating module, an offset prediction module, and an image positioning and recognition module.

The feature extraction and fusion module is configured to extract features from the acquired SAR image to obtain feature maps, and perform multi-scale fusion on the obtained feature maps, to obtain a multi-scale feature map.

The anchor box generating module is configured to receive the multi-scale feature map and generate anchor boxes, where 9 anchors are generated corresponding to each point on the feature map, which cover all possible objects on the original image.

The offset prediction module is configured to make a prediction score and a prediction offset for each anchor box, then match all the anchor boxes and labels, and calculate values of IOU to determine whether the anchor boxes belong to background or foreground, where a standard is established to distinguish positive samples from negative samples, to obtain a set of proposal boxes Proposal.

The image positioning and recognition module is configured to perform classification and regression on the proposal boxes Proposal, to position and recognize the target, so as to obtain a final detection result.

The embodiment further provides a target detection device, including a memory, a processor, and a computer program stored in the memory and operable on the processor. The processor executes the computer program to implement steps of the method described above.

Specifically, before detection is performed, a target detection model needs to be constructed. In this embodiment, the target detection model is constructed through the following steps:

constructing a model framework CRTransSar with a two-stage target detector Cascade-mask-rcnn as basic architecture;

adding, to the model framework CRTransSar, a feature extraction network CRbackbone based on contextual joint representation learning Transformer;

introducing a self-attention module block to a Swin transformer on which the feature extraction network CRbackbone is based;

introducing a multidimensional hybrid convolution to PatchEmBed of the Swin transformer; and introducing a cross-resolution attention enhancement neck CAENeck to the model framework CRTransSar, to form the target detection model.

The target detection model is further described below with reference to FIG. 2 to FIG. 7.

Figure 2:
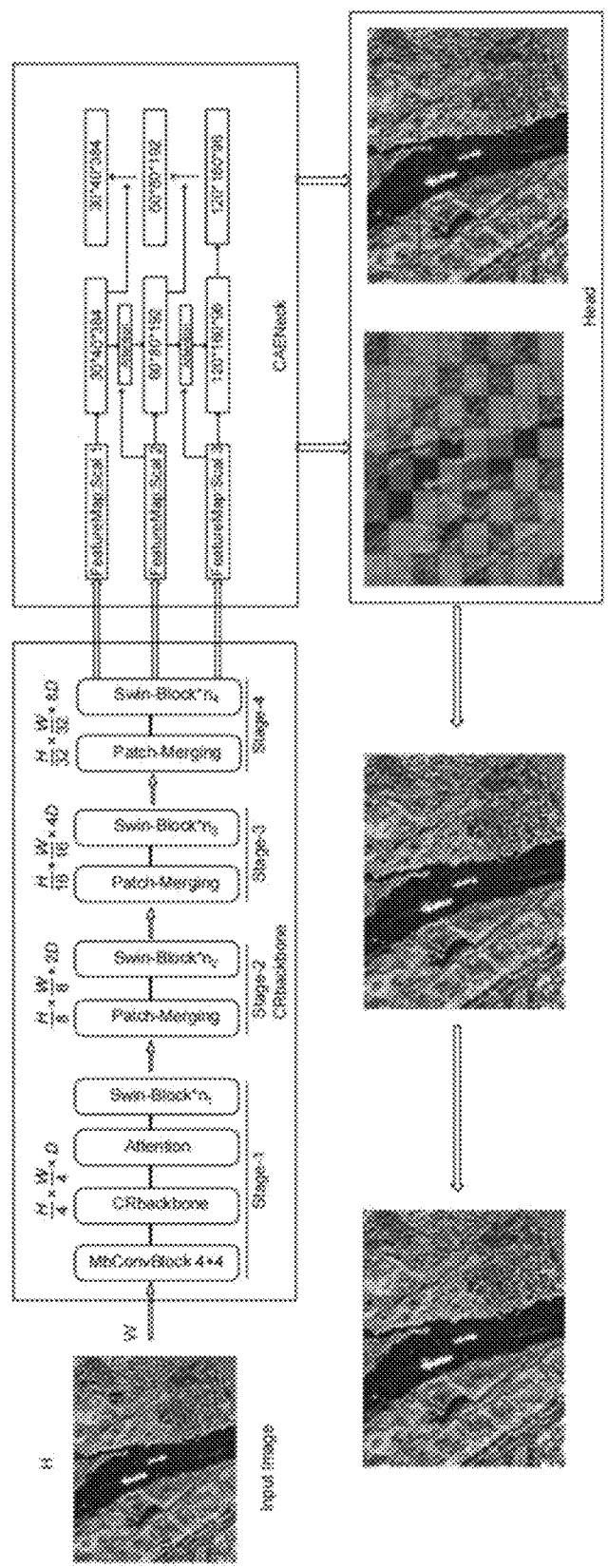
FIG. 2 is an overall network block diagram of a model framework CRTransSar.
Figure 3:
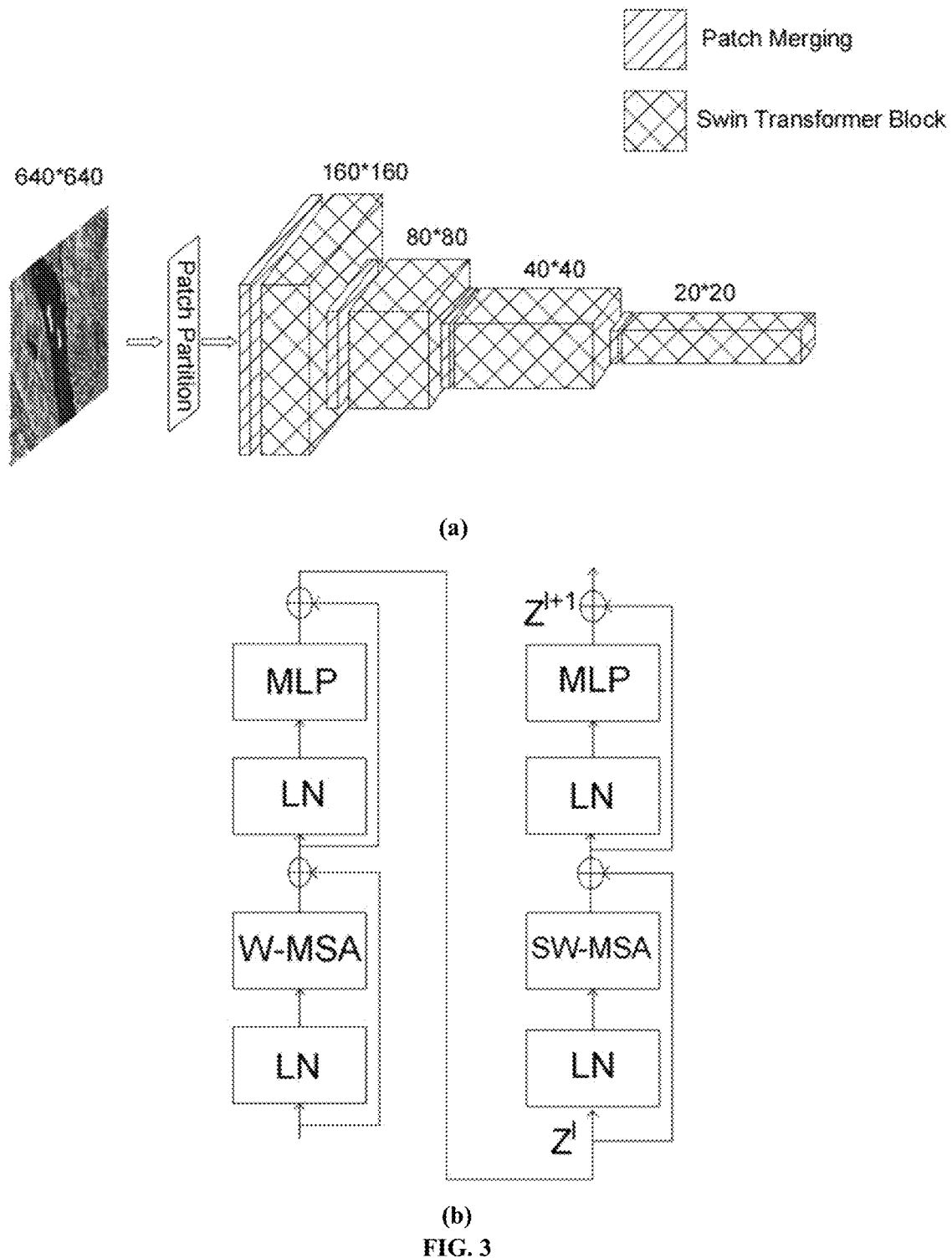
FIGS. 3A and 3B are overall structural diagrams of a Swin transformer.

Embodiments of the present disclosure use the two-stage target detector Cascade-mask-rcnn with good comprehensive performance as basic architecture, and on this basis, conduct optimization design for the unique characteristics of SAR targets, to construct the framework of the present disclosure: CRTransSar, as shown in FIG. 2. It should be noted that, all the modules of the present disclosure can be flexibly embedded into any target detection framework. To verify the effectiveness of the modules designed in the present disclosure, the present disclosure selects the Cascade-mask-rcnn as basic architecture.

The CRTransSar mainly includes four parts: CRbackbone, CAENeck, rpn-head, and roi-head, which are described in detail below.

I. Backbone Based on Contextual Joint Representation Learning: CRbackbone

In response to strong scattering, sparseness, multiple scales, and other characteristics of SAR targets, the present disclosure combines the advantages of the transformer and CNN architectures to design a target detection backbone based on contextual joint representation learning, which is called CRbackbone, so that the model can make full use of contextual information to perform joint representation learning, and extract richer contextual feature salient information, thereby improving the feature description of multi-scale SAR targets. The CRbackbone mainly includes three modules: Swin transformer, multidimensional hybrid convolution, and self-attention.

First, the present disclosure introduces the Swin transformer, which currently performs best in NLP and optical classification tasks, as the basic backbone. Next, the present disclosure incorporates the ideal of multi-scale local information acquisition of the CNN and redesigns the architecture of the Swin transformer. Inspired by the architectures of latest EfficientNet and CoTNet, the present disclosure introduces the multidimensional hybrid convolution in the PatchEmbed part to expand the receptive field, depth, and resolution, thereby enhancing the feature perception domain. Furthermore, the self-attention module is introduced to enhance contextual information exchange between different windows on the feature map.

Figure 4:
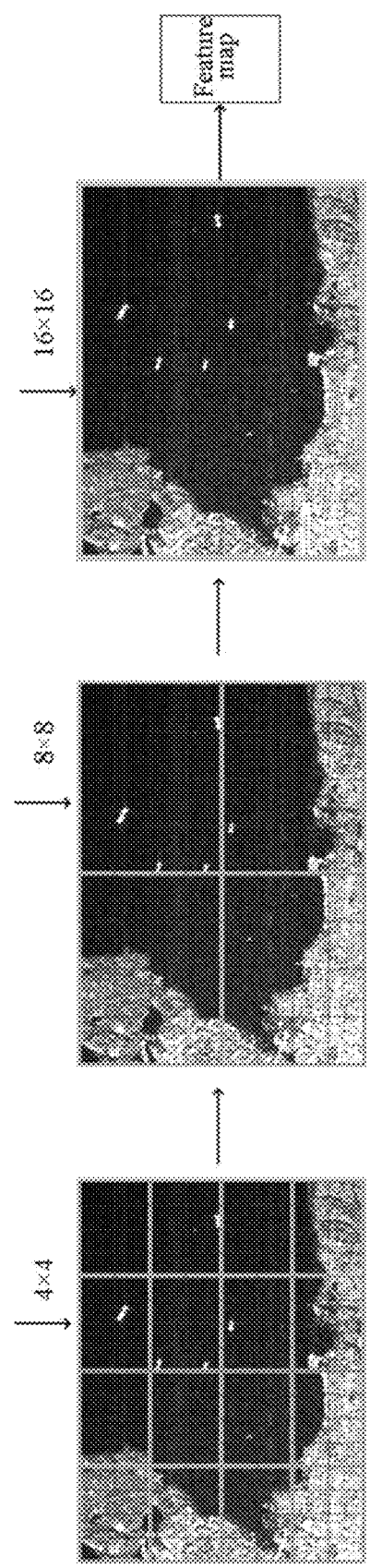
FIG. 4 shows a Swin transformer sliding window.

Swin transformer module: For SAR images, small target ships in large scenes easily lose information in the process of downsampling. Therefore, the present disclosure introduces the Swin transformer. The framework is as shown in FIGS. 3A and 3B. FIG. 3A is a structural diagram of the Swin transformer, and FIG. 3B shows Swin transformer blocks. The transformer has general modeling capabilities and is complementary to convolution. It also has powerful modeling capabilities, better connections between vision and language, a large throughput, and large-scale parallel processing capabilities. When a picture is inputted into the network of the present disclosure, the picture is expected to be sent into the transformer for processing. Therefore, in the present invention, the image is divided into tokens similar to those in NLP. To meet the high-resolution characteristics in the image and the language difference in NLP, a layered Transformer is introduced, whose representation is calculated by moving the window. By limiting self-attention calculations to non-overlapping local windows while allowing cross-window connections, the shifted window scheme achieves higher efficiency. This layered architecture has the flexibility of modeling at various scales and has linear computational complexity relative to the image size. This is an improvement to the vision transformer. The vision transformer always focuses on the patches that are obtained through segmentation at the beginning and does not perform any operations on the patches in the subsequent process. Thus, the receptive field is not affected. A Swin transformer is process of enlarging a window. Then, the calculation of self-attention is in units of windows. This is equivalent to introducing locally aggregated information, which is similar to the convolution process of the CNN. The step size of the CNN is similar to the size of the convolution kernel; thus, the windows do not overlap. The difference is that the CNN performs convolution calculation in each window, and a value is finally obtained from each window, which represents the characteristics of this window. The Swin transformer performs self-attention calculation in each window to obtain an updated window. Next, through a patch merging operation, the windows are merged, and the self-attention calculation is continued in the merged window. The Swin transformer splices the patches of the 4 surrounding windows together in the process of continuous downsampling, and the number of patches decreases. In the end, the entire image has only one window and 7 patches. Therefore, in the present disclosure, the downsampling means reducing the number of patches, but the size of the patches increases, which increases the receptive field, as shown in FIG. 4.

The Swin transformer performs self-attention calculation in each window. Compared with the global attention calculation performed by a transformer, it is assumed in the present disclosure that complexity of a known multiple sequence alignment (MSA) is the square of the image size. According to the complexity of the MSA, it can be calculated that the complexity is $(3\times3)^2=81$ in the present disclosure. The Swin transformer calculates self-attention in each local window (the red part). According to the complexity of MSA, it can be obtained in the present disclosure that the complexity of each red window is 1×1 squared, which is 1 to the fourth power. Then, complexity of 9 windows is summed, and the final complexity is 9, which is greatly reduced. The calculation formulas for the complexity of MSA and W-MSA are expressed by Formula 1 and Formula 2.

Although calculation of self-attention inside the window may greatly reduce the complexity of the model, different windows cannot exchange information with each other, resulting in a lack of expressiveness. To better enhance the performance of the model, shifted-windows attention is introduced. Shifted windows alternately move between successive Swin transformer blocks.

$$\Omega(MSA)=4\ hwC^2+2(hw)^2C$$

$$\Omega(W\text{-}MSA)=4\ hwC^2+2M^2\ hwC$$

In the formula, w denotes a length and a width of each window, and C denotes the number of channels of each window.

Figure 5:
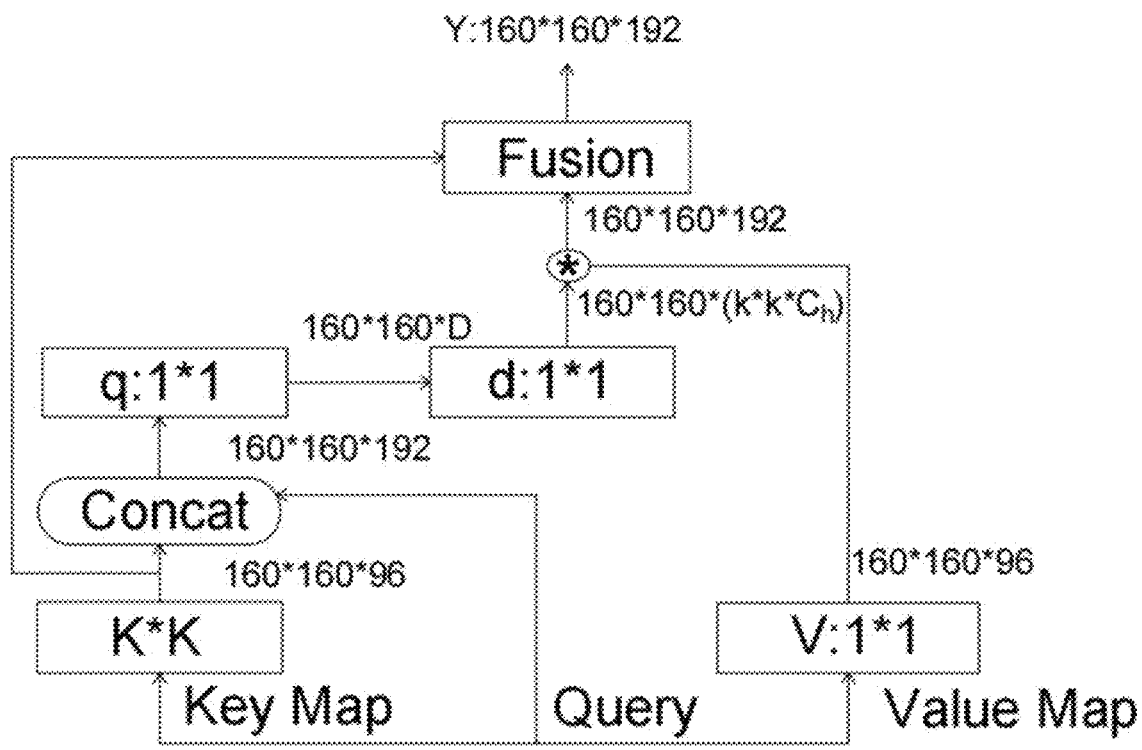
FIG. 5 shows a self-attention module block.

Self-attention module: Due to its spatial locality and other characteristics in computer vision tasks, the CNN can only model local information and lacks the ability to model and perceive long distances. The Swin transformer introduces a shifted window partition to solve this defect. Information exchange between different windows is enhanced, and is no longer limited to the exchange of local information. Furthermore, based on multi-head attention, the present disclosure takes into account the CotNet contextual attention mechanism and integrates the self-attention module block into the Swin transformer. The independent Q and K matrices in the transformer are connected to each other. After the feature extraction network proceeds to PatchEmbed, the feature map inputted to the network has dimensions of 640*640*3. Next, it is determined whether the width and height of the feature map are each an integer multiple of 4; if not, a padding operation is performed, followed by two convolutions. The number of feature channels changes from 3 to 96, and the feature dimensions becomes ¼ of the previous dimensions. Finally, the size of the self-attention module is 160*160*96, and the size of the convolution kernel is 3×3. The feature dimensions and feature channels of the contextual self-attention module remain unchanged, which strengthens the information exchange between different windows on the feature map. The self-attention module is as shown in FIG. 5. In the traditional self-attention mechanism, the CoT block structure integrates the contextual information with self-attention. First, three variables are defined: Q=X, K=X, and V=XWv. V is subjected to 1×1 convolution processing, then K is subject to a grouped convolution operation of K×K and is recorded as $K^1$; the Q matrix and $K^1$ are subject to a concat operation. The result after the concat operation is subject to two 1×1 convolutions. The calculation is as shown in Formula 3.

$$A=[K^1,Q]W_\theta W_\delta$$

In the formula, $W_\theta W_\delta$ represents a convolution operation, which is performed twice; and Q and K represent three matrices.

Here, A does not just model the relationship between Q and K. Thus, through the guidance of context modeling, the communication between each part is strengthened, and the self-attention mechanism is enhanced. Then, matrix multiplication is performed on A and V to obtain $K^2$.

Figure 6:
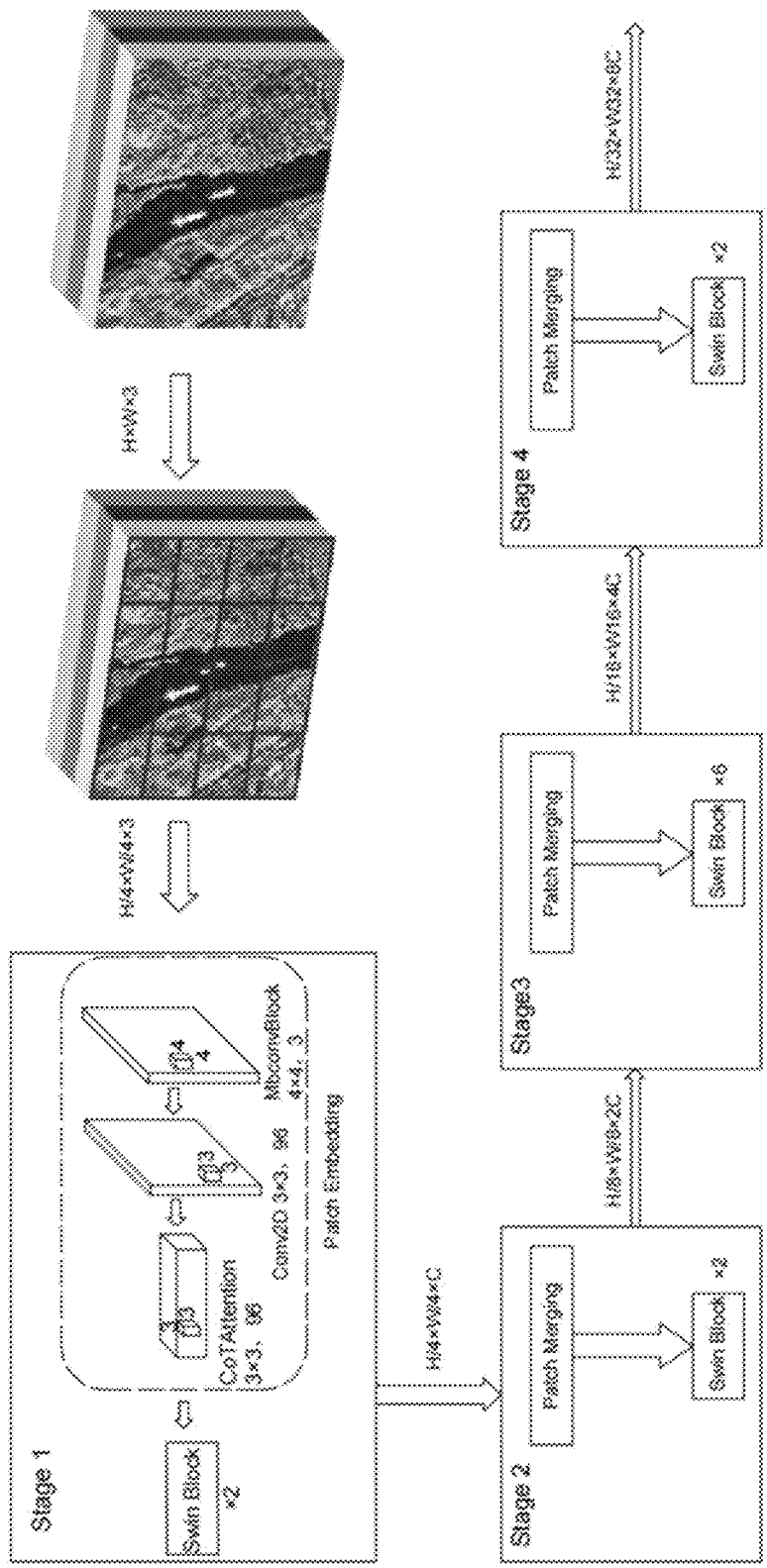
FIG. 6 shows an overall architecture of a feature extraction network CRbackbone.

Multidimensional hybrid convolution module: To increase the receptive field according to the characteristics of SAR targets, the proposed method is described in detail below. The feature extraction network proposed in the present disclosure uses the Swin transformer as basic structure to improve the backbone. The CNN convolution is integrated into the PatchEmBed module with the attention mechanism, and it is reconstructed. The structural diagram of the entire feature extraction network is as shown in FIG. 6. Affected by the Efficient network, a multidimensional hybrid convolution module is introduced in the PatchEmbed module. This network is introduced in the present disclosure because according to the mechanism characteristics of the CNN, the more convolutional layers are stacked, the larger the receptive field of the feature maps. In the prior art, the performance of the network is generally improved by expanding the receptive field, increasing the depth of the network, or increasing the resolution. In the present disclosure, the above three methods can be combined to implement a hybrid parameter expansion method. There is plenty of research in this direction, such as MobileNet, ShuffleNet, M-NasNet, etc. The model is compressed by reducing the amounts of parameters and calculations. The model is applied to mobile devices and edge devices. The accuracy of the model is greatly improved while the amounts of parameters and calculations are considerably reduced. The PatchEmbed module mainly increases the channel dimensions of each patch in a set of non-overlapping patches which are divided from the inputted picture with dimensions of H×W×3 through patch partition processing, so as to reduce the size of the feature map and send the feature map to the Swin transformer block for processing. Each feature map has dimensions of 2×3×H×W when sent to the PatchEmbed, and has dimensions of 2×96×H/4×W/4 when finally sent to the next module. 4× downsampling is implemented through a convolutional layer and the number of channels becomes 96. In the present disclosure, a layer of multidimensional hybrid convolution module is stacked before 3×3 convolution. The size of a convolution kernel is 4, and the number of channels fed into the convolution is kept unchanged. In this way, the receptive field is expanded and the network depth is increased, thereby improving the efficiency of the model.

II. Cross-Resolution Attention Enhancement Neck: CAENeck

Figure 7:
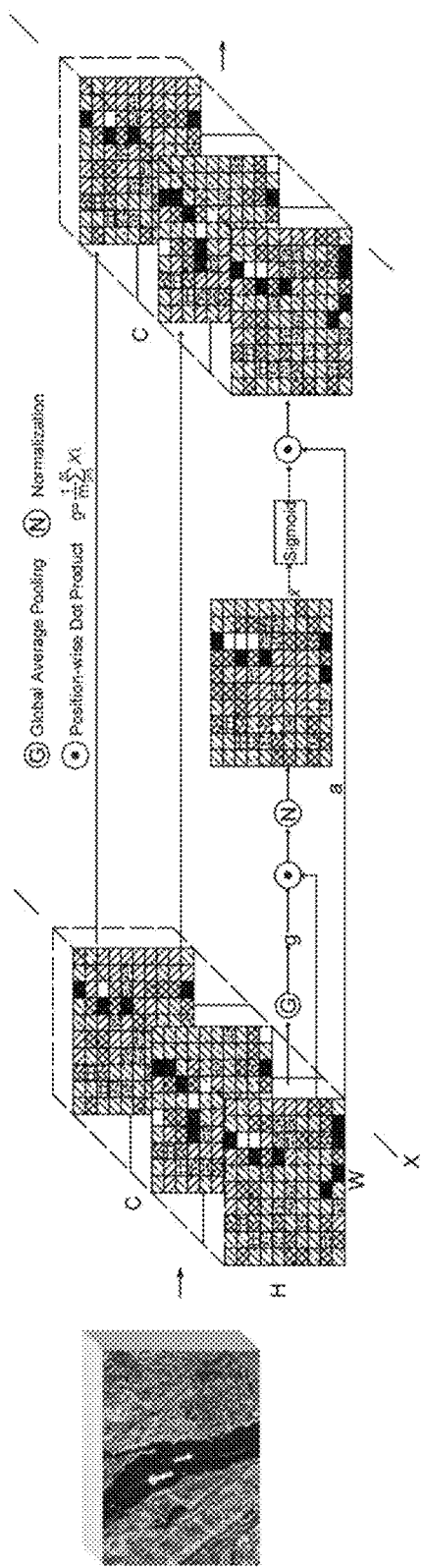
FIG. 7 shows an overall architecture of a cross-resolution attention enhancement neck CAENeck.

To address of characteristics of small targets in large scenes, strong scattering of SAR imaging, and low distinction between targets and backgrounds, embodiments the present disclosure, inspired by the structures of spatial group-wise enhance (SGE) attention and pyramid attention network (PAN), design a new cross-resolution attention enhancement neck, which is called CAENeck. Specific steps include: dividing a feature map into G groups according to the channels, then calculating the attention of each group, performing global average pooling on each group to obtain g, next performing matrix multiplication on g and the original group feature map, and then performing a normalization operation. Additionally, a sigmoid operation is performed to obtain a result, and a matrix multiplication is performed on the obtained result and the original group feature map. The specific steps are shown in FIG. 7. The attention mechanism is added to connect the contextual information, and attention is incorporated at the top-to-bottom connection. This is to better integrate the shallow and deep feature map information, and to better extract the features of small targets and positions of the targets. In the present disclosure, upsampling is performed during the transfer process of the feature map from top to bottom, and the size of the feature map is increased. The deepest layer is strengthened by the self-attention module and concatenated with the feature map of the middle layer, and then forms a concat connection with the shallowest feature map through the self-attention module. The specific steps are as follows. The neck receives the feature maps of three scales: 30*40*384, 60*80*192, 120*160*96, where the feature map with the scale of 30*40*384 is the deepest feature map, which is subject to upsampling and attention enhancement operations, to be connected with the feature map with the scale of 60*80*192. Finally, upsampling and attention enhancement are carried out to connect with the shallowest feature map. The series of operations are carried out from top to bottom. Next, bottom-up multi-scale feature fusion is performed. FIG. 1 shows the neck part. The SAR target is an extremely small target in a large scene, especially a marine ship target of a SAR ship detection dataset (SSDD). At sea, a ship has very little pixel information, and information of small objects is easily lost in the process of downsampling. The high-level feature map is rich in semantic information for prediction, but is not conducive to the positioning of targets; the bottom feature map has little semantic information but is conducive to positioning of targets. A feature pyramid network (FPN) structure is a fusion of high and low levels from top to bottom, which is achieved through upsampling. The self-attention module is added during the upsampling process to integrate contextual information mining and self-attention mechanism into a unified body, thereby continuously enhancing the ability to extract information of target positions. With the bottom-up module, a pyramid structure from bottom to top is achieved, which realizes the fusion of the bottom level and the high levels after downsampling, thus enhancing the extraction of semantic feature information. The small feature map is responsible for detecting large ships, and the large feature map is responsible for detecting small ships. Therefore, attention enhancement is suitable for multi-scale ship detection in SAR images.

III. Loss Function

The loss function is used to estimate the gap between the model output $\bar{y}$ and the true value y to guide the optimization of the model. The present disclosure uses different loss functions in the head part. In the RPN-head, a classification loss adopts a cross-entropy loss, and a regression loss adopts a $\text{smooth}_{L1}$ function. Specific formulas are as follows:

In the RPN-head (regional extraction network in the head), a classification loss adopts a cross-entropy loss, and a regression loss adopts a $\text{smooth}_{L1}$ function. Specific formulas are as follows:

$$L(\{P_i\}, \{t_i\}) = \frac{1}{N_{class}} \sum_i L_{cls}(p_i, p_i^*) + \lambda \frac{1}{N_{reg}} \sum_i P_i^* L_{reg}(t_i, t_i^*) \sum_i L_{cls}(P_i, P_i^*)$$

represents an anchor classification loss that is screened out, $N_{class}$ represents N classes, $P_i$ represents a true class value of each anchor, and $P_i^*$ represents a predicted class of each anchor, and $$\lambda \frac{1}{N_{reg}}$$

is used for balancing the two losses.

$$\sum_i P_i^* L_{reg}(t_i, t_i^*)$$

represents a regression loss, and the regression loss uses the following formula:

$$L_{reg}(t_i, t_i^*) = \Sigma_{i \in x,y,w,h} \text{smooth}_{L1}(t_i - t_i^*)$$

where $t_i$ represents a true class value, and $t_i^*$ represents a predicted class.

$$\text{smooth}_{L1}(x) = \begin{cases} 0.5x^2 & \text{if } |x| < 1 \\ |x| - 0.5 & \text{otherwise.} \end{cases}$$

In this embodiment, a two-way multi-scale connection operation is enhanced through top-down and bottom-up attention, to guide learning of dynamic attention matrices and enhance feature interaction under different resolutions. In this way, the model can extract the multi-scale target feature information with higher accuracy, for bounding box regression and classification, to suppress interfering background information, thereby enhancing the visual expressiveness. After the attention enhancement module is added, the detection performance can be greatly improved with almost no increase in the parameter amount and calculation amount of the whole neck.

The above are merely preferred specific embodiments of the present disclosure, and the scope of protection of the present disclosure is not limited to this. All simple variations or equivalent substitutions of the technical solution readily obtained by any person skilled in the art within the technical scope disclosed by the present disclosure should fall within the protection scope of the present disclosure.

What is claimed is:

1. A contextual visual-based synthetic-aperture radar (SAR) target detection method, comprising the following steps:

obtaining an SAR image; and inputting the SAR image into a target detection model, and positioning and recognizing a target in the SAR image by using the target detection model, to obtain a detection result, wherein the target detection model is constructed through the following steps:

constructing a model framework CRTransSar with a two-stage target detector Cascade-mask-rcnn as basic architecture;

adding, to the model framework CRTransSar, a feature extraction network CRbackbone based on contextual joint representation learning transformer;

introducing a self-attention module block to a Swin transformer on which the feature extraction network CRbackbone is based;

introducing a multidimensional hybrid convolution to PatchEmBed of the Swin transformer; and introducing a cross-resolution attention enhancement neck CAENeck to the model framework CRTransSar, to form the target detection model.

2. The contextual visual-based SAR target detection method according to claim 1, wherein the positioning and recognizing for the image by using the target detection model specifically comprises:

extracting features from the inputted SAR image by using the feature extraction network CRbackbone to obtain feature maps, and performing multi-scale fusion on the obtained feature maps, to obtain a multi-scale feature map, wherein a bottom feature map is responsible for predicting a first target, a high-level feature map is responsible for predicting a second target, and the first target is smaller than the second target;

receiving, by a region proposal network (RPN) module, the multi-scale feature map, and generating 9 anchor boxes corresponding to each point on the multi-scale feature map, which cover all possible objects on the image; and making a prediction score and a prediction offset for each anchor box by using a 1×1 convolution, then matching all the anchor boxes and all labels, and calculating values of intersection over union (IOU) to determine whether the anchor boxes belong to background or foreground, wherein a standard is established to obtain a set of proposal boxes proposal, and the IOU indicates an intersection over union between a predicted bounding box and a real bounding box;

sending the multi-scale feature map and the proposal boxes proposal into region of interest (ROI) pooling for unified processing; and sending a processing result into a fully connected RCNN network for classification and regression, to position and recognize the target, so as to obtain a final detection result.

3. The contextual visual-based SAR target detection method according to claim 1, wherein the self-attention module processes the image through the following steps:

after the feature extraction network CRbackbone proceeds to the PatchEmbed, determining a width and a height of each feature map to determine whether to perform a padding operation; and performing two convolutions on each feature map to change feature channels, feature dimensions, a size of the self-attention module, and the size of the convolution kernel.

4. The contextual visual-based SAR target detection method according to claim 1, wherein the cross-resolution attention enhancement neck CAENeck processes the image through the following steps:

receiving the feature maps by the cross-resolution attention enhancement neck CAENeck;

performing upsampling and attention enhancement operations on the feature maps, and connecting the feature maps of different sizes; and performing bottom-up multi-scale feature fusion on the feature maps.

5. A transformer-based synthetic-aperture radar (SAR) target detection apparatus, comprising a data acquisition module and a data processing module, wherein the data acquisition module is configured to acquire an SAR image; and the data processing module comprises:

a feature extraction and fusion module, configured to extract features from the acquired SAR image to obtain feature maps, and perform multi-scale fusion on the obtained feature maps, to obtain a multi-scale feature map;

an anchor box generating module, configured to receive the multi-scale feature map and generate 9 anchor boxes corresponding to each point on the multi-scale feature map, which cover all possible objects on the image;

an offset prediction module, configured to make a prediction score and a prediction offset for each anchor box, then match all the anchor boxes and all labels, and calculate values of IOU to determine whether the anchor boxes belong to background or foreground, wherein a standard is established to obtain a set of proposal boxes proposal; and an image positioning and recognition module, configured to perform classification and regression on the proposal boxes proposal, to position and recognize the target, so as to obtain a final detection result.

* * * * *